United States Patent
Steininger

(10) Patent No.: US 12,245,554 B2
(45) Date of Patent: Mar. 11, 2025

(54) DEVICE FOR HARVESTING TIMBER

(71) Applicant: Werner Steininger, Peuerbach (AT)

(72) Inventor: Werner Steininger, Peuerbach (AT)

( * ) Notice: Subject to any disclaimer, the term of this patent is extended or adjusted under 35 U.S.C. 154(b) by 263 days.

(21) Appl. No.: 18/021,300

(22) PCT Filed: Aug. 26, 2021

(86) PCT No.: PCT/EP2021/073674
§ 371 (c)(1),
(2) Date: Feb. 14, 2023

(87) PCT Pub. No.: WO2022/058139
PCT Pub. Date: Mar. 24, 2022

(65) Prior Publication Data
US 2023/0292683 A1    Sep. 21, 2023

(30) Foreign Application Priority Data
Sep. 17, 2020  (AT) .............................. A 50789/2020

(51) Int. Cl.
*A01G 23/093* (2006.01)
(52) U.S. Cl.
CPC .................................. *A01G 23/093* (2013.01)
(58) Field of Classification Search
CPC .... A01G 23/08; A01G 23/083; A01G 23/091; A01G 23/093; A01G 23/095
See application file for complete search history.

(56) References Cited

U.S. PATENT DOCUMENTS

| 3,991,799 A | 11/1976 | Albright et al. |
| 2004/0238068 A1 | 12/2004 | Duval |
| 2006/0021675 A1 | 2/2006 | Gurosik et al. |
| 2006/0034651 A1 | 2/2006 | Gurosik et al. |
| 2008/0196790 A1 | 8/2008 | Fargeot |

FOREIGN PATENT DOCUMENTS

| AT | 516454 | 5/2015 | |
| CA | 2 431 601 | 11/2003 | |
| DE | 29910859 U1 * | 10/1999 | ........... A01G 23/083 |
| WO | 03/011011 | 2/2003 | |

OTHER PUBLICATIONS

Int'l Search Report (Form PCT/ISA/210) conducted in Int'l Appln. No. PCT/EP2021/073674 (Nov. 24, 2021).
Int'l Written Opinion (Form PCT/ISA/237) conducted in Int'l Appln. No. PCT/EP2021/073674 (Nov. 24, 2021).

* cited by examiner

*Primary Examiner* — Matthew Katcoff
(74) *Attorney, Agent, or Firm* — GREENBLUM & BERNSTEIN, P.L.C.

(57) ABSTRACT

Timber harvesting device, having an extension arm and a sawing unit and gripper unit attached to the extension arm. The gripper unit has a gripper pair for a tree trunk, and the sawing unit has a cutting element, e.g., a chain saw, which is arranged to be pivotable out of a saw box for severing the tree trunk. The saw box is pivotably arranged about a pivot axis on the gripper unit and is connected to the gripper unit via a spring element and a piston-cylinder unit. The spring element defines a predetermined cutting position of the saw box via a restoring torque about the pivot axis, and the saw box is pivotable by the piston-cylinder unit into an inclined position which is tilted relative to the cutting position. The bearing of the piston-cylinder unit has a free movement space in the cutting position of the saw box.

8 Claims, 4 Drawing Sheets

Figure 1:
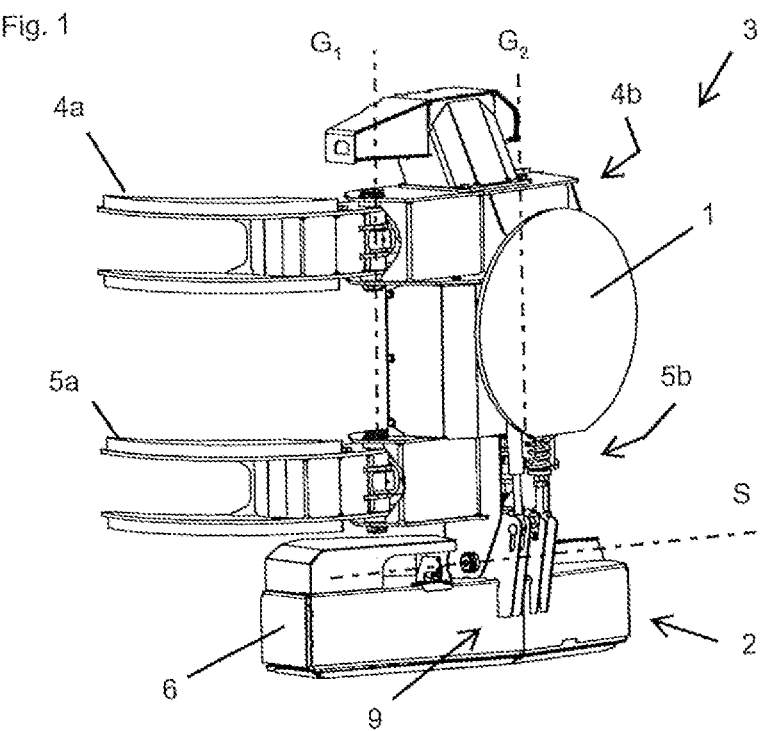

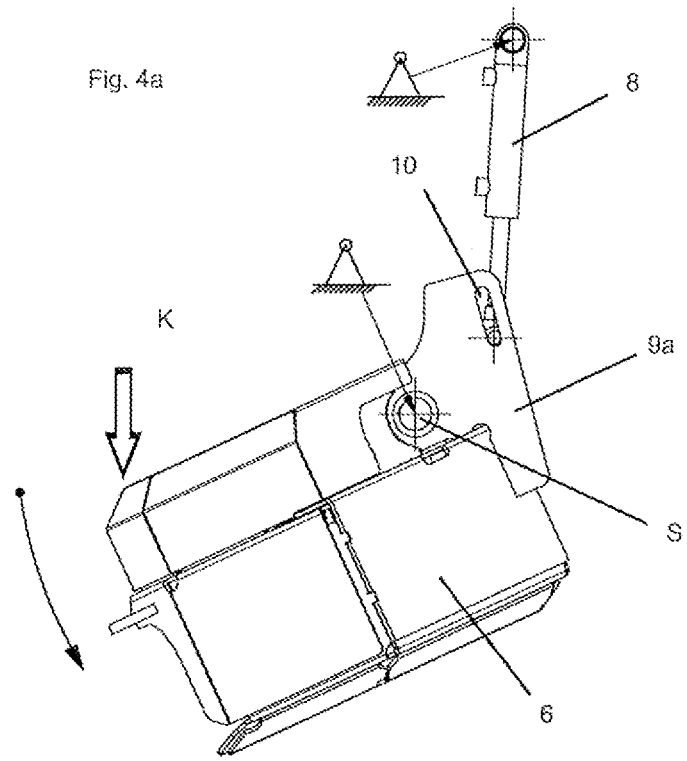
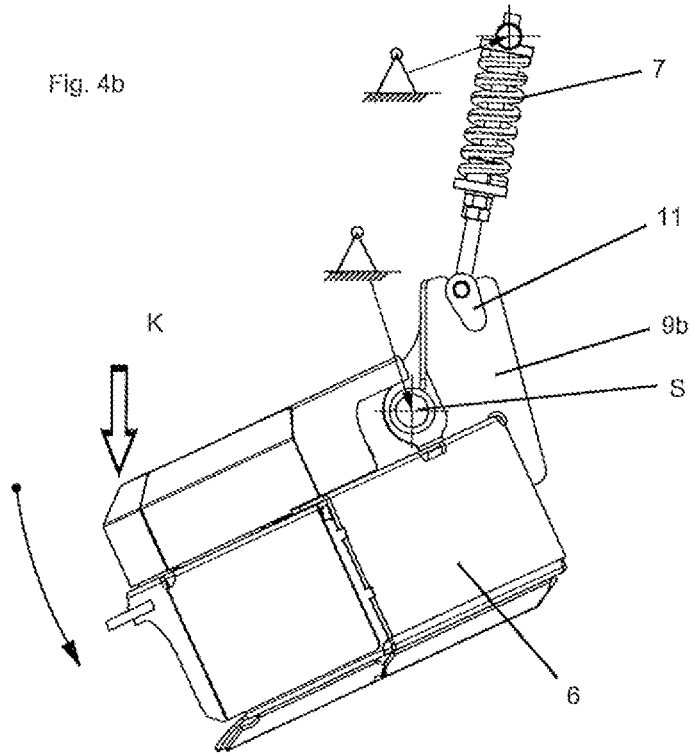

DEVICE FOR HARVESTING TIMBER

The invention relates to a device for harvesting timber, having a controllable extension arm and a sawing and gripper unit which is attached to the extension arm and comprises a sawing unit and a gripper unit, wherein the gripper unit has at least one gripper pair of two gripper arms for a tree trunk which can be pivoted about gripper pivot axes relative to one another, and the sawing unit has a pivot drive, which is arranged in a saw box, for a cutting element, which is arranged such that it can be swung out of the saw box and is designed as a chain saw, for severing the tree trunk, according to the preamble of claim 1.

Devices of the mentioned type were described in AT 516.454 B1 of the applicant and are used for timber harvesting, wherein an operator controls an extension arm from an operating pulpit of the device in such a way that gripper arms arranged on a sawing and gripper unit enclose a tree trunk, wherein subsequently a closing pressure is exerted on the gripper arms via a corresponding hydraulic system, which fix the tree trunk relative to the extension arm via a pincer-like movement. After the tree trunk has been fixed, the cutting element can be pivoted so that the tree trunk is cut through. The cutting element is designed as a chain saw and is pivotably mounted in the saw box, wherein it can be swung out of the saw box with the aid of a pivot drive arranged in the saw box in order to cut through a tree trunk held by the gripper arms in an area lying below the gripper arms. Due to its fixation relative to the extension arm by means of the gripper arms, the severed tree trunk remains in a fixed position and can subsequently be moved in a controlled manner by appropriate control of the extension arm.

The cutting element is thereby subjected to high loads in practical use. When using a chain saw, the severed tree trunk exerts high forces on the guide bar of the chain saw due to its increasingly acting dead weight, which cannot be completely absorbed by the extension arm, which can lead to wedging of the guide bar and damage to the chain saw. Therefore, in the above-mentioned AT 516,454 B1 of the applicant, a cutting mechanism comprising the cutting element and the pivot drive for the cutting element was proposed, which is movably arranged on a gripper mechanism of the sawing and gripper unit comprising the gripper arms. The movable suspension gives the guide bar of the chain saw sufficient mobility to be able to absorb loads during the complete severing of a tree trunk fixed by the gripper arms. Loads on the guide bar of the chain saw and associated damage can thus be reduced.

However, practical use shows that the tree trunk held by the gripper arms can sometimes not be completely fixed during and after cutting through the tree trunk and can slip off. In this case, the guide bar of the chain saw is not only massively loaded, but its function and pivotability can also be completely blocked. The above-mentioned mobility of the cutting unit relative to the gripping unit is sometimes not sufficient to prevent these loads and possible blockages.

Thus, it is the aim of the invention to reduce loads on the cutting element during the cutting of a tree trunk in a device for timber harvesting mentioned at the beginning and, in particular, to avoid functional impairments due to blockages of the cutting element.

These aims are achieved by the features of claim 1. Claim 1 relates to a device for timber harvesting with a controllable extension arm and a sawing and gripper unit, which is attached to the extension arm and comprises a sawing unit and a gripper unit, wherein the gripper unit has at least one gripper pair of two gripper arms for a tree trunk, which are pivotable about gripper pivot axes relative to one another, and the sawing unit has a pivot drive, which is arranged in a saw box, for a cutting element, which is arranged such that it can be pivoted out of the saw box, for severing the tree trunk, which cutting element is designed as a chain saw. In accordance with the invention, it is proposed here that the saw box is pivotably arranged on the gripper unit about a pivot axis and is connected to the gripper unit via a spring element and a piston-cylinder unit, wherein the spring element defines a predetermined cutting position of the saw box via a restoring torque about the pivot axis in its equilibrium position, with an associated cutting plane of the cutting element, and the saw box is pivotable by means of the piston-cylinder unit, by overcoming the restoring torque of the spring element, into an inclined position which is tilted relative to the cutting position and with which an inclined plane of the cutting element tilted relative to the cutting plane is associated, wherein the bearing of the piston-cylinder unit on the saw box or on the gripper unit has a free movement space in the cutting position of the saw box.

Thus, according to the invention, on the one hand a suspension of the sawing unit movable about the pivot axis relative to the gripper unit is achieved with the aid of the spring element. Loads acting on the cutting element during the cutting of a tree trunk are thus reduced, wherein the spring element defines, by means of a restoring torque about the pivot axis in its equilibrium position, a predetermined cutting position of the saw box with an associated cutting plane of the cutting element, into which the cutting element is returned with the aid of the spring element after deflections due to external loads. In order to avoid the above-mentioned blockages of the cutting element, a piston-cylinder unit is additionally provided which can be activated by an operator and, after activation, overcomes the restoring torque of the spring element and pivots the saw box into an inclined position relative to the cutting position, to which an inclined plane of the cutting element tilted relative to the cutting plane is assigned. In this way, the cutting element can be tilted to an inclined plane spaced from the trunk to prevent or clear blockages. The spring element and the piston-cylinder unit are attached in this case to both the saw box and the gripper unit in such a way that they can each move about axes of rotation parallel to the pivot axis. Since it is also provided that the bearing of the piston-cylinder unit on the saw box or on the gripper unit has a free movement space in the cutting position of the saw box, mobility of the saw box and thus also of the cutting element is ensured even when the piston rod is inactive and thus unmoved. By activating the piston-cylinder unit, the saw box can be tilted into its inclined position by means of the piston-cylinder unit, wherein the spring element is pressed along.

The free space for movement can be designed as an elongated hole arranged on the saw box, in which the piston rod of the piston-cylinder unit is mounted with the aid of a plain bearing. The saw box is thus held with clearance in its cutting position relative to the piston-cylinder unit, since it can move relative to the piston rod within the limits of the elongated hole, which corresponds to the free movement space provided in accordance with the invention. After activation of the piston-cylinder unit and reaching the elongated hole limitation, the saw box is tilted by the piston-cylinder unit about the pivot axis.

One specific embodiment of the spring element and piston-cylinder unit is that the spring element and the piston rod of the piston-cylinder unit are attached to a linkage area that is formed on or attached to the saw box and kinematically forms a two-armed lever with the saw box about the pivot axis, with the saw box forming a first lever arm and the linkage area forming a second lever arm. The linkage area can be designed, for example, in the form of plate-shaped linkage levers projecting from the saw box, to which the spring element and the piston-cylinder unit are attached in an articulated manner. The linkage lever provided for bearing the piston rod of the piston-cylinder unit has the elongated hole mentioned above to ensure freedom of movement. The spring element is articulated to an associated linkage lever with the aid of a pivot bearing, which ensures that the spring element can move about an axis of rotation parallel to the pivot axis.

The pivot axis is preferably arranged below the lowest pair of grippers and perpendicular to their gripper pivot axes. When the gripper pivot axes are arranged vertically for gripping around a tree trunk, the pivot axis of the saw box is therefore aligned horizontally so that the saw box can be tilted downwards. The spring element and the piston-cylinder unit are preferably arranged on the side of the gripper unit facing away from the gripper arms. The saw box is designed in a conventional manner per se and opens in the direction in which the gripper arms also open. When pivoting out of the saw box, the cutting element thus passes in a known manner through an area located below the gripper arms for cutting through a tree trunk.

To simplify the kinematic conditions, it is proposed that the spring element be designed as a helical compression spring arranged essentially parallel to the longitudinal axis of the piston-cylinder unit. The piston-cylinder unit thus acts essentially along the effective axis of the helical compression spring. As already mentioned, the helical compression spring and the piston-cylinder unit are attached to both the saw box and the gripper unit so that they can be moved about axes of rotation parallel to the pivot axis.

Furthermore, it is proposed that the cutting element designed as a chain saw is provided with a grease lubrication. Compared to oil lubrication, grease lubrication has the advantage that oil mist cannot occur during work at high altitudes, which could contaminate the operating pulpit. In addition, the application of lubricant is more consistent and therefore more economical with grease lubrication.

In order to ensure optimum chain tension at all times, it is further proposed that the cutting element designed as a chain saw is provided with an automatic chain tensioner. In this way, optimum chain tension is always ensured, regardless of the operating time.

Figure 2:
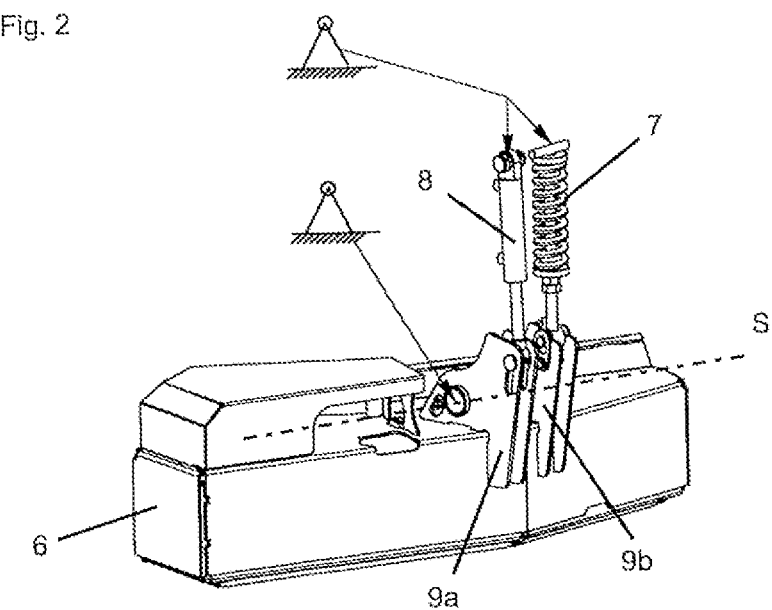
Figure 3A:
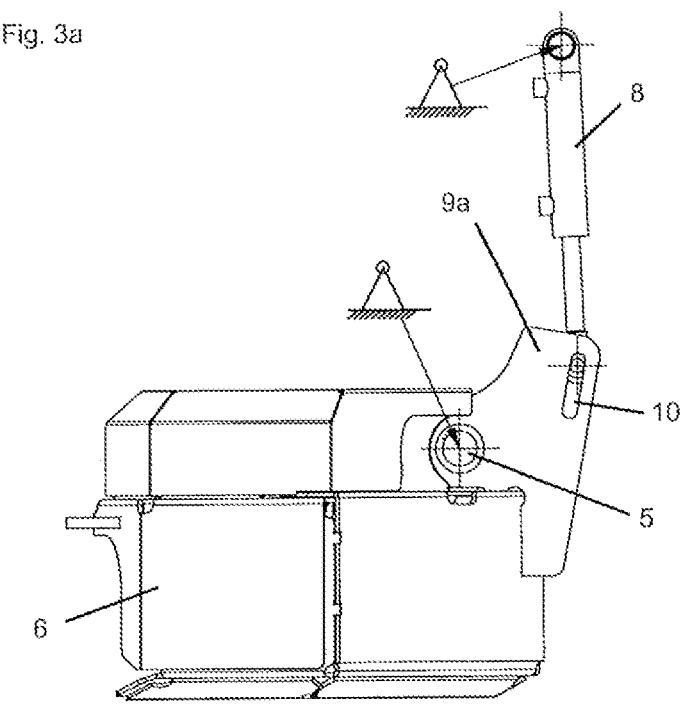
Figure 3B:
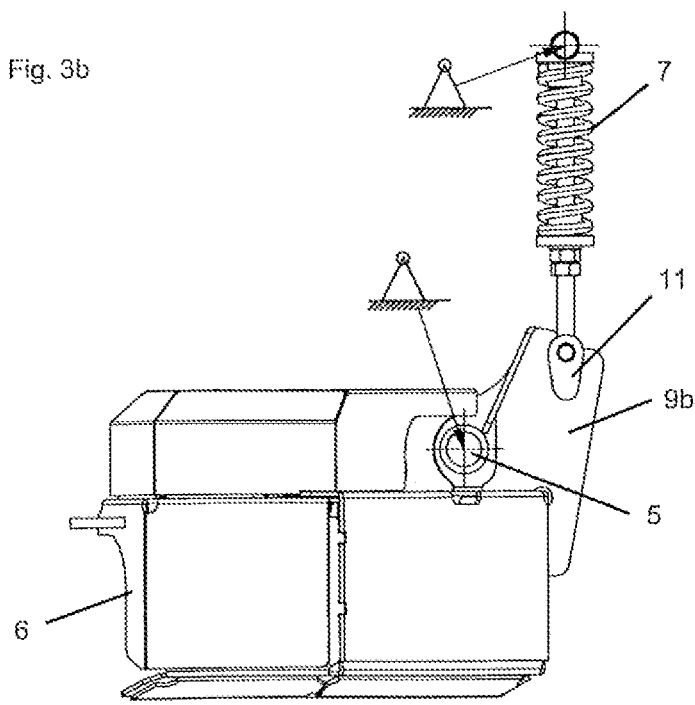
Figure 5A:
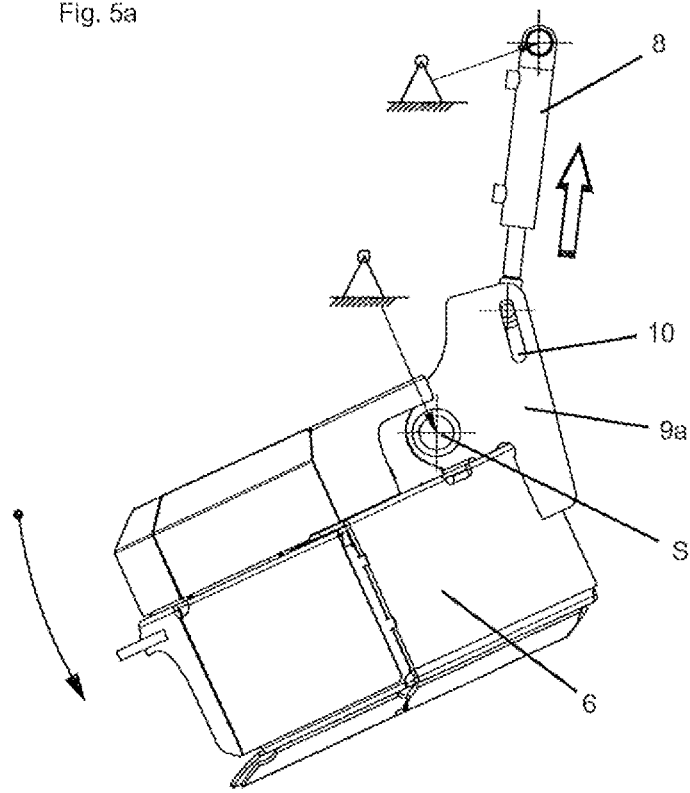
Figure 5B:
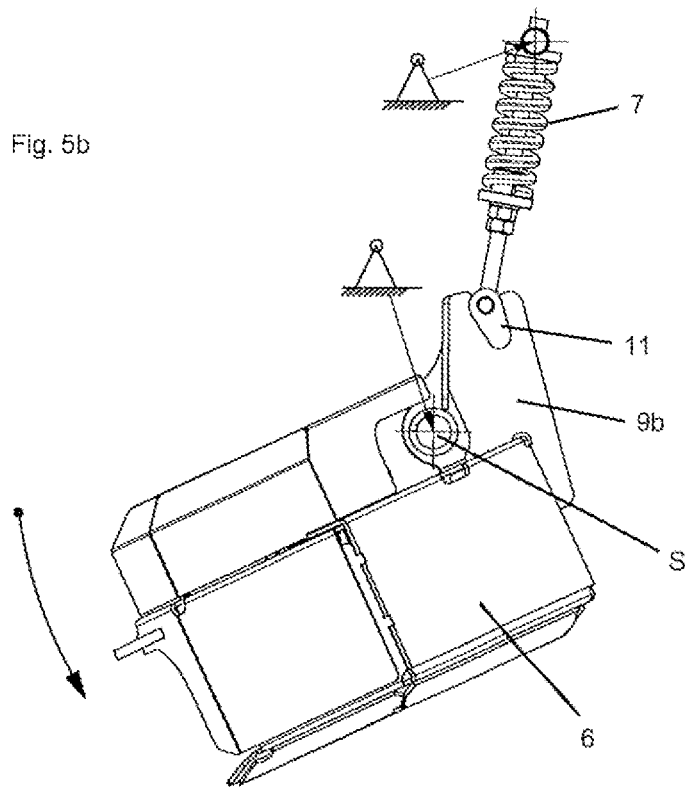

The invention is explained in more detail below by means of an exemplary embodiment with the aid of the accompanying figures, wherein the figures show as follows:

FIG. 1 shows a perspective view of an embodiment of the invention, showing only the sawing and gripper unit with its attachment area for attachment to an extension arm, FIG. 2 shows a representation of the sawing unit with the spring element and the piston-cylinder unit, FIG. 3a shows a side view of the sawing unit with the piston-cylinder unit according to FIG. 1 in a basic position, in which the saw box is in a cutting position, FIG. 3b shows a side view of the sawing unit with the spring element according to FIG. 1 in a basic position, in which the saw box is in a cutting position, FIG. 4a shows a side view of the sawing unit with an inactive piston-cylinder unit according to FIG. 1 in a position deflected from the basic position by loads, FIG. 4b shows a side view of the sawing unit with an active spring element according to FIG. 1 in a position deflected from the basic position by loads, FIG. 5a shows a side view of the sawing unit with an active piston-cylinder unit according to FIG. 1 in an inclined position deflected by the piston-cylinder unit from the basic position, and FIG. 5b shows a side view of the sawing unit with the spring element co-pressed according to FIG. 1 in an inclined position deflected from the basic position by the piston-cylinder unit.

First of all, reference is made to FIG. 1, which shows a perspective view of a sawing and gripping unit according to the invention with its attachment area 1 for attachment to an extension arm (not visible in FIGS. 1-5). The sawing and gripper unit comprises a sawing unit 2 and a gripper unit 3.

In the exemplary embodiment shown, the gripper unit 3 has two pairs of grippers 4, 5 of two gripper arms 4a, 4b, 5a, 5b for a tree trunk, which can be pivoted about gripper pivot axes $G_1$, $G_2$ to each other, wherein the gripper arms 4b, 5b are concealed by the visible parts of the gripper unit 3, and the sawing unit 2 has a pivot drive, arranged in a saw box 6, for a cutting element, arranged such that it can be pivoted out of the saw box 6, for cutting through the tree trunk, which cutting element is designed as a chain saw. The attachment area 1 establishes the connection to an extension arm not shown in FIGS. 1-5, for example via a rotating mechanism by means of which the sawing and gripper unit can be rotated relative to the extension arm and which comprises a gripper-side rotating part arranged on the gripper unit 3 and an extension-arm-side rotating part arranged on the extension arm. The movements of the extension arm are thus transmitted directly to the sawing and gripper unit via the rotating mechanism. The rotating mechanism can also be used to effect a rotational movement of the sawing and gripper unit relative to the extension arm. Hydraulic lines (not shown in FIGS. 1 to 5) for the pairs of grippers 4, 5 extend on or in the attachment area 1, which are operated by an operating pulpit and cause the pairs of grippers 4, 5 to close and open. When closing, the gripper pairs 4, 5 swing towards each other in a pincer-like manner, and when opening they move away from each other.

The saw box 6 is designed in a conventional manner and opens in the direction in which the pairs of grippers 4, 5 also open. When pivoting out of the saw box 6, the cutting element thus traverses in a known manner an area located below the gripper arms 4a, 4b, 5a, 5b for cutting through a tree trunk. The sawing unit 2 is arranged on the gripper unit 3 so as to be pivotable about a pivot axis S, a suspension of the sawing unit 2 relative to the gripper unit 3 being realized with the aid of a spring element 7 so as to be movable about the pivot axis S (see also FIG. 2). The spring constant of the spring element 7 is selected in such a way that, on the one hand, safe cutting guidance is ensured, but, on the other hand, sufficient flexibility of the suspension is ensured when loads are applied to the chain saw. The pivot axis S is preferably arranged below the lowest pair of grippers 5 and perpendicular to their gripper pivot axes $G_1$, $G_2$. When the gripper pivot axes $G_1$, $G_2$ are arranged vertically for gripping around a tree trunk, the pivot axis S of the saw box 6 is therefore aligned horizontally so that the saw box 6 can be tilted downward. The pivot axis S further represents a bearing via which the saw box 6 is hinged to the gripper unit 3, as shown in FIGS. 2-5.

In addition to the spring unit 7, a piston-cylinder unit 8 is provided, wherein the spring element 7 and the piston-cylinder unit 8 are arranged on the side of the gripper unit 3 facing away from the gripper arms 4a, 4b, 5a, 5b. In the embodiment shown, the spring element 7 is designed as a helical compression spring, which is arranged essentially parallel to the longitudinal axis of the piston-cylinder unit 8. The piston-cylinder unit 8 thus acts essentially along the effective axis of the helical compression spring. The spring element 7 and the piston rod of the piston-cylinder unit 8 are attached to a linkage area 9, which is integrally formed on or attached to the saw box 6 and kinematically forms a two-armed lever with the saw box 6 about the pivot axis S, wherein the saw box 6 forms a first lever arm and the linkage area 9 forms a second lever arm. In the exemplary embodiment shown, the linkage area 9 is designed in the form of plate-shaped linkage levers 9a, 9b projecting from the saw box 6, to which the spring element 7 and the piston-cylinder unit 8 are attached in an articulated manner. The linkage lever 9a provided for fastening the piston rod of the piston-cylinder unit 8 has an elongated hole 10 (see in particular FIGS. 3a, 4a, 5a) for ensuring a free movement space for the saw box 6. The spring element 7 is articulated to the linkage lever 9b associated with it with the aid of a pivot bearing 11, which ensures mobility of the spring element 7 about an axis of rotation parallel to the pivot axis S. On the side facing away from the linkage area 9, the spring element 7 and the piston-cylinder unit 8 are likewise attached to the gripper unit 3 so that they can move about axes of rotation parallel to the pivot axis S. As shown in FIGS. 3-5, the spring element 7 and the piston-cylinder unit 8 are mounted on the gripper unit 3 on the side facing away from the linkage area 9 in such a way that forces can be dissipated via the gripper unit 3.

The spring element 7 and the piston-cylinder unit 8 thus form, together with the bearing of the pivot axis S, a suspension for the saw box 6, wherein the spring element 7 defines, by means of a restoring torque about the pivot axis S in its equilibrium position, a predetermined cutting position of the saw box 6 with a cutting plane of the cutting element assigned to it, into which the cutting element is returned with the aid of the spring element 7 after deflections due to external loads. Since the saw box 6 is held with play in its cutting position relative to the piston-cylinder unit 8 with the aid of the elongated hole 10 and can thus move relative to the piston rod within the limits of the elongated hole 10, mobility of the saw box 6 and the cutting element is ensured even when the piston rod is inactive and thus motionless.

By activating the piston-cylinder unit 8, the saw box 6 can be actively and controllably tilted by the piston-cylinder unit 8 about the pivot axis S into its inclined position, to which an inclined plane of the cutting element tilted with respect to the cutting plane is assigned, by overcoming the restoring torque of the spring element 7 and on reaching the limit of the elongated hole, wherein the spring element 7 is co-pressed. In this way, the cutting element can be tilted into an inclined plane at a distance from the tree trunk in order to avoid or remove blockages.

The operation and advantages of the invention will be described in more detail below.

FIG. 1 first shows a configuration in which a tree trunk can be encompassed, wherein the sawing and gripper unit is oriented with substantially vertical gripper pivot axes $G_1$, $G_2$ of the pairs of grippers 4, 5 and of the pivot drive of the chain saw. The cutting plane of the chain saw is oriented substantially horizontally. The axis of rotation of the rotating mechanism is also oriented substantially horizontally in this positioning. During the cutting operation of the chain saw, the rotating mechanism is locked and does not perform any rotary movements, so that the tree trunk is largely fixed relative to the extension arm during the cutting operation of the chain saw. As mentioned, the pairs of grippers 4, 5 serve to enclose a tree trunk to be cut, wherein they fix the tree trunk in the closed state. When the pairs of grippers 4, 5 are closed, the chain saw is inside the saw box 6 and thus in an inactive position. After the pairs of grippers 4, 5 have been closed and the tree trunk is thus fixed, the pivot drive for the chain saw can be activated from the operating pulpit, wherein on the one hand the rotating movement of the cutting chain is started, and on the other hand the chain saw is pivoted out of the saw box 6 and pivoted in the direction of the tree trunk to be cut. The rotating cutting chain of the chain saw thus enters the tree trunk and cuts through it. In order to be able to deposit the severed tree trunk, the locking of the rotating mechanism is released and the rotating mechanism is actuated in such a way that the sawing and gripper unit is pivoted into a position in which the severed tree trunk is aligned substantially horizontally and can be deposited on the ground.

However, cutting through a tree trunk with the help of a chain saw is not without problems, as described at the beginning. In particular, due to the increasingly acting dead weight of the tree trunk, the guide bar and the rotating cutting chain of the chain saw can block. Although blocking of the chain saw could be avoided by appropriate control of the extension arm, this is hardly successful in practice. In particular, when the chain saw exits after completely cutting through the tree trunk, impact-like loads become effective that cannot be absorbed quickly enough by controlling the extension arm.

These loads acting on the chain saw are reduced by the fact that the sawing unit 2 is arranged on the gripper unit 3 so as to be pivotable about the pivot axis S, and a suspension of the sawing unit 2 relative to the gripper unit 3 that is movable about the pivot axis S is realized with the aid of the spring element 7. This basic position is shown in FIGS. 3a and 3b. In this case, the spring element 7 defines a predetermined cutting position of the saw box 6 in its equilibrium position with a substantially horizontal cutting plane of the cutting element assigned to it via a restoring torque about the pivot axis S. The piston-cylinder unit 8 initially remains inactive. However, since the saw box 6 is held with clearance in its cutting position relative to the piston-cylinder unit 8 with the aid of the elongated hole 10 and can thus move relative to the piston rod within the limits of the elongated hole 10, mobility of the saw box 6 and the cutting element about the pivot axis S is ensured even when the piston rod is inactive and thus unmoved.

Loads acting on the cutting element during the cutting of a tree trunk are reduced with this bearing, since they can be cushioned about the pivot axis S with the aid of the spring element 7, as shown in FIGS. 4a and 4b. In FIGS. 4a and 4b, a load is represented in the form of an external force K, which would in itself place a heavy load on the saw box 6 and the cutting element. However, the saw box 6 can spring down in the direction of the drawn arrow in the event of such an external load due to the spring bearing around the pivot axis S, whereby the loads on the cutting element can be reduced. The spring element 7 exerts a restoring torque about the pivot axis S on the saw box 6 and the cutting element, which returns them to the cutting position with an essentially horizontal cutting plane after deflections caused by external loads.

In order to avoid blockages of the cutting element, for example due to a slipped tree trunk, the piston-cylinder unit 8 can additionally be activated, as shown in FIGS. 5a and 5n.

After activation of the piston-cylinder unit 8 in the direction of the arrow shown upwards in FIG. 5a, the saw box 6 can be pivoted in the direction of the arrow facing downwards in overcoming the restoring torque of the spring element 7 into an inclined position relative to the cutting position, to which a plane of inclination of the cutting element tilted relative to the cutting plane is assigned, wherein the spring element 7 is compressed. In this way, the cutting element can be tilted to an inclined plane spaced from the tree trunk in order to avoid or remove blockages. Subsequently, the piston-cylinder unit 8 can be returned to its initial position in order to return the saw box 6 to its cutting position.

With the aid of the invention, loads on the cutting element during the cutting of a tree trunk can thus be reduced and, in particular, functional impairments due to blockages of the cutting element can be avoided.

The invention claimed is:

1. A device for timber harvesting, having a controllable extension arm and a sawing and gripper unit which is attached to the extension arm and comprises a sawing unit as well as a gripper unit, wherein the gripper unit has at least one gripper pair of two gripper arms for a tree trunk which can be pivoted about gripper pivot axes relative to one another, and the sawing unit has a pivot drive, which is arranged in a saw box, for a cutting element, which is arranged such that it can be pivoted out of the saw box, for severing the tree trunk, which cutting element is designed as a chain saw, wherein the saw box is pivotably arranged on the gripper unit about a pivot axis and is connected to the gripper unit via a spring element and a piston-cylinder unit, wherein the spring element defines a predetermined cutting position of the saw box via a restoring torque about the pivot axis in its equilibrium position, with an associated cutting plane of the cutting element, and the saw box is pivotable by the piston-cylinder unit, by overcoming the restoring torque of the spring element, into an inclined position which is tilted relative to the cutting position and with which an inclined plane of the cutting element tilted relative to the cutting plane is associated, wherein the bearing of the piston-cylinder unit on the saw box or on the gripper unit has a free movement space in the cutting position of the saw box.

2. The device according to claim 1, wherein the free movement space is designed as an elongated hole arranged on the saw box, in which the piston rod of the piston-cylinder unit is mounted with the aid of a plain bearing.

3. The device according to claim 1, wherein the spring element and the piston rod of the piston-cylinder unit are fastened to a linkage area which is integrally formed on or fastened to the saw box and kinematically forms with the saw box a two-armed lever about the pivot axis, wherein the saw box forms a first lever arm and the linkage area (9)-forms a second lever arm.

4. The device according to claim 1, wherein the pivot axis is arranged below the lowermost pair of grippers and perpendicular to their gripper pivot axes.

5. The device according to claim 1, wherein the spring element and the piston-cylinder unit are arranged on the side of the gripper unit facing away from the gripper arms.

6. The device according to claim 1, wherein the spring element is designed as a helical compression spring arranged substantially parallel to the longitudinal axis of the piston-cylinder unit.

7. The device according to claim 1. wherein the cutting element designed as a chain saw is provided with a grease lubrication.

8. The device according to claim 1, wherein the cutting element designed as a chain saw is provided with an automatic chain tensioner.

* * * * *